United States Patent [19]

Kitamura et al.

[11] 4,401,874
[45] Aug. 30, 1983

[54] METHOD OF WELDING TIN-FREE STEEL CAN

[75] Inventors: Yoichi Kitamura, Yokohama; Makoto Ito; Chikara Yurita, both of Kawasaki, all of Japan

[73] Assignee: Toyo Seikan Kaisha Ltd., Tokyo, Japan

[21] Appl. No.: 240,816

[22] Filed: Mar. 5, 1981

[30] Foreign Application Priority Data

Mar. 8, 1980 [JP] Japan ............................ 55-28586

[51] Int. Cl.³ ............................................ B23K 11/32
[52] U.S. Cl. ...................................... 219/64; 219/84; 219/118
[58] Field of Search ................ 219/64, 83, 92, 91.21, 219/118, 119, 84

[56] References Cited

U.S. PATENT DOCUMENTS 3,978,803  2/1976  Asano et al.
4,282,981  4/1981  Kitamura et al.
4,334,138  6/1982  Matsuno .............................. 219/64

FOREIGN PATENT DOCUMENTS 36860  1/1974  Japan .

OTHER PUBLICATIONS

Silamn et al., "Protective and Decorative Coarings for Metals," p. 556 (1978).
Lyman et al., "Metals Handbook," 8th Edition, vol. 2, p. 547; vol. 6, pp. 83-86.

Primary Examiner—Elliot A. Goldberg
Attorney, Agent, or Firm—Sherman & Shalloway

[57] ABSTRACT

Disclosed is a process for the preparation of welded cans, which comprises forming a blank into a cylinder and passing a lap portion of the formed cylinder between a pair of electrode rollers through an electrode wire to effect electric resistance welding, wherein said blank is a tin-free steel blank comprising a steel plate substrate, a layer of metallic chromium formed on the surface of the steel plate substrate and a layer of chromium oxide formed on the metallic chromium layer, and electric resistance welding is carried out in an inert atmosphere in the state where an electrode wire having a plated layer of a soft metal selected from the group consisting of tin and alloys thereof, the thickness of said plated layer being 0.1 to 20 μm, is kept in close contact with the chromium oxide layer of the tin-free steel blank.

The inner and outer surfaces of the side seam of a welded can according to this process are covered with a continuous or discontinuous protecting covered layer including a metallic chromium layer and a chromium oxide layer formed thereon, and the thickness of steel oxide exposed through this discontinuous portion is controlled below 400 Å. Since exposure of steel in the inner and outer surfaces of the seam is thus controlled, the corrosion resistance, lacquer adhesion and appearance charcteristics of the seam are highly improved in this welded can.

5 Claims, 4 Drawing Figures 4,401,874

METHOD OF WELDING TIN-FREE STEEL CAN

BACKGROUND OF THE INVENTION

1. Field of the Invention

The present invention relates to a novel tin-free steel welded can and a process for the preparation thereof. More particularly, the present invention relates to a novel process for the preparation of tin-free steel welded cans in which electric resistance welding is directly carried out without removal of a chromium oxide layer of a high electric resistance which is present on the outer surface of tin-free steel. Furthermore, the present invention relates to a process for forming a weld seam excellent in the corrosion resistance, lacquer adhesion and appearance characteristics.

2. Description of the Prior Art

As the conventional can-forming method ordinarily adopted in the art, there can be mentioned a method in which a can blank such as tinplate is formed into a cylinder and both the side edges are bonded together by lap seaming, lock seaming or combination thereof using a solder or adhesive. This conventional method, however, is defective in that a considerable area is necesary for the seam portion, and the method is not preferred from the viewpoint of saving of resources. Moreover, the bonded can prepared according to this method is insufficient in the strength and durability of the seam. Furthermore, when the seam is formed by using a solder or adhesive, since there is present a considerable step difference in the side seam, leakage is readily caused in this step portion if a can end is double-seamed to the can body.

As the can-forming method that has heretofore been adopted instead of the method using a solder, there can be mentioned a draw-ironing method. Although so-called seamless cans prepared according to this method are used in some fields, these seamless cans cannot be used at all as vacuum cans, that is, cans which are subjected to retort sterilization after packing of contents, because the side wall of the can body is drastically deformed under pressure in these seamless cans. As another instance of the can-forming method that can be used instead of the method using a solder, there is known a method in which both the side edges of the can blank are lap-bonded together by welding. In a so-called welded can prepared according to this method, the area of the lap seam portion is smaller than in the soldered can and the thickness of the seam portion is relatively thin. Therefore, the above-mentioned problem of the step difference is moderated in the welded can, and furthermore, the welded can is advantageous over the bonded can, because a particular bonding agent such as a solder or adhesive need not be used. However, when a certain kind of a can stock is used, the can-forming operations become complicated, and the conventional welded cans are still insufficient in the corrosion resistance, lacquer adhesion and appearance characteristics of the seam.

Tin-free steel obtained by subjecting a cold rolled steel plate to an electrolytic treatment with chromic acid, which is used as a can stock, is cheaper and more readily available than other can stocks such as tinplate, and tin-free steel is advantageous in that it is excellent in the corrosion resistance and lacquer adhesion. However, this tin-free steel (hereinafter referred to as "TFS") involves the following problem. Namely, since a chromium oxide layer having a high electric resistance is inevitably present on the outer surface, flow of an electric current is inhibited by this layer when the above-mentioned electric resistance welding is carried out.

A welded seam can is ordinarily prepared by forming a can blank into a cylinder and subjecting the side edges to be lapped of the cylinder to electric resistance welding by passing the side edges between a pair of upper and lower electrode rollers optionally through an electric wire. When a TFS blank is used, a troublesome operation of removing a chromium oxide layer on the steel substrate should be conducted prior to the welding operation, with the result that the conventional method of preparing welded TFS cans has a disadvantage in that the number of the process is increased. Furthermore, since the steel substrate is exposed in the bonded area by removal of the chromium oxide layer, the corrosion resistance and lacquer adhesion are inevitably degraded in this area. Removal of the chromium oxide layer is ordinarily accomplished by mechanically cleaning the portions to be lapped of the can blank. At this cleaning step, the chromium oxide layer or coated lacquer in other areas is damaged by pieces or particles separated from the can blank by cleaning, and another problem of incorporation of these pieces or particles into the packed content arises.

SUMMARY OF THE INVENTION

We found that when electric resistance welding is carried out in the state an electrode wire having a plated layer of a soft metal selected from tin and alloys thereof is kept in close contact with a chromium oxide layer of a TFS blank, a weld seam having a high strength can be formed without removal of the chromium oxide layer and that the weld seam thus prepared is prominently excellent over the weld seam of a conventional edge cleaned TFS welded can in the corrosion resistance, lacquer adhesion and appearance characteristics.

It is therefore a primary object of the present invention to provide a process for the preparation of TFS welded cans in which the above-mentioned defects of the conventional method for the preparation of edge cleaned TFS welded cans are eliminated.

Another object of the present invention is to provide a process for the preparation of TFS welded cans in which electric resistance welding is directly carried out without removal of a chromium oxide layer of a high electric resistance present on the outer surface of a TFS blank.

Still another object of the present invention is to provide a TFS can having a weld seam excellent in the corrosion resistance, lacquer adhesion and appearance characteristics and a process for the preparation of such TFS cans.

In accordance with one fundamental aspect of the present invention, there is provided a process for the preparation of welded cans, which comprises forming a can blank into a cylinder and passing a lap portion of the formed cylinder between a pair of electrode rollers through an electrode wire to effect electric resistance welding, wherein said can blank is a tin-free steel blank comprising a steel plate substrate, a layer of metallic chromium formed on the surface of the steel plate substrate and a layer of chromium oxide formed on the metallic chromium layer, and electric resistance welding is carried out in an inert atmosphere in the state where an electrode wire having a plating layer of a soft metal selected from the group consisting of tin and alloys thereof, the thickness of said plating layer being 0.1 to 20 μm, is kept in close contact with the chromium oxide layer of the tin-free steel blank.

In accordance with another fundamental aspect of the present invention, there is provided a tin-free steel welded can having a side seam formed by welding, wherein the inner and outer surfaces of said side seam are covered with a continuous or discontinuous protecting covered layer including a metallic chromium layer and a layer of a chromium oxide formed on the metallic chromium layer, the thickness of a steel oxide layer exposed through the discontinuous portion of the protecting covered layer is controlled below 400 Å, and the area of steel exposed to the inner and outer surfaces of the seam is controlled below 50% of the exposed area of steel in a welded side seam formed by a conventional seam welding method.

Figure 1:
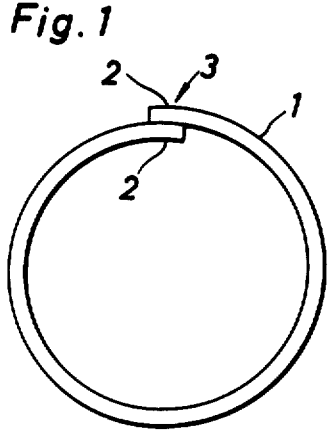
FIG. 1 is a top plan view showing the welded can according to the present invention.

In the drawings, reference numerals 1, 2, 3, 4, 5, 6, 7, 8, 11, 11', 12, 12' and 13 represent a TFS can blank, a side edge, a side seam, a steel substrate, a metallic chromium layer, a chromium oxide layer, a crack, an oxide layer, an intermediate electrode (wire), an intermediate electrode (wire), an electrode roll, an electrode roll and a material to be welded, respectively.

DETAILED DESCRIPTION OF THE PREFERRED EMBODIMENTS

Referring to FIG. 1 illustrating the welded seam can according to the present invention, a blank 1 comprised of a TFS plate is formed into a cylinder, and both the side edges 2 are lapped together and bonded together by specific welding means described in detail hereinafter to form a side seam 3.

Figure 2:
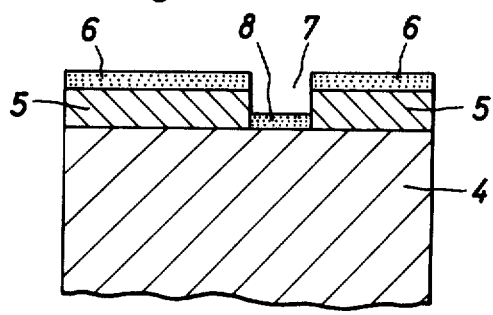
FIG. 2 is an enlarged sectional view illustrating the side seam portion of the welded can shown in FIG. 1.

Referring to FIG. 2 illustrating this side seam 3 in the magnified manner, the prominent feature of the welded can according to the present invention is that on the inner and outer surface portions of the side seam 3, there is formed a protecting covered layer comprising a metallic chromium layer 5 and a chromium oxide layer 6 formed thereon. As pointed out hereinbefore, in conventional TFS welded cans, since the chromium layer is removed in advance in the side edge portions to be lapped and welded, steel is exposed to the inner and outer surfaces of the side seam, causing drastic reduction of the corrosion resistance and lacquer adhesion of the seam. Furthermore, the exposed steel is oxidized to blue black $Fe_3O_4$ at the welding step, resulting in reduction of the appearance characteristics of the seam. Moreover, since this iron oxide layer is porous, the corrosion resistance and lacquer adhesion are further degraded. In contrast, according to the present invention, since electric resistance welding is directly carried out without removal of the chromium covered layer on the steel plate substrate, the seam can be formed in the state where the chromium covered layer excellent in the corrosion resistance and lacquer adhesion is retained on the inner and outer surfaces of the seam, and by virtue of the presence of the chromium covered layer, oxidation of steel can be prevented, and a good appearance can be maintained.

Since the chromium covered layer present on the inner and outer surfaces of the seam is harder than steel and is very thin, it sometimes happens that a crack 7 is formed in the chromium covered layer at the welding step. However, according to the present invention, the area of steel exposed through this crack 7, that is, the discontinuous portion, can be controlled below 50%, especially 40%, of the exposed area of steel in the seam formed according to the conventional seam welding method under the condition of using a non-plated copper wire electrode and an atmosphere of air.

In the present invention, if electric resistance welding of the TFS blank is carried out in an inert atmosphere and preferably, the cooling speed is controlled within a specific range described hereinafter, the thickness of the oxide layer 8 inevitably formed in the portion of steel 4 exposed through the crack 7 can be controlled below 400 Å.

It is said that of the chromium covered layer, the metallic chromium layer has a relation to the corrosion resistance and the chromium oxide layer has a relation to the lacquer adhesion. If the thickness of the chromium oxide layer is too large, no sufficient flow of an electric current can be obtained at the welding process, and the appearance characteristics of the can blank are degraded. Accordingly, there is present a preferred range for the thickness of the chromium oxide layer. More specifically, in the TFS blank that is used in the present invention, it is preferred that the amount of the metallic chromium layer be 20 to 100 mg/m², especially 20 to 50 mg/m², and that the amount of the chromium oxide layer be 1 to 10 mg/m², especially 2 to 6 mg/m², as calculated as metallic chromium. This TFS blank is characterized in that the amount of the chromium oxide layer is relatively smaller than in conventional TFS blanks customarily used in manufacture of adhesive bonded cans and the like. The above-mentioned TFS blank that is used in the present invention is prepared according to the methods disclosed in Japanese Patent Publications No. 13008/66 and No. 5532/68, though the applicable preparation process is not limited to those disclosed in these literature references.

Figure 3:
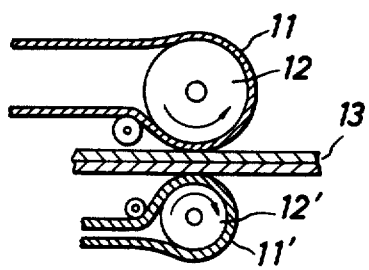
FIG. 3 is a diagram illustrating the steps of the process for the preparation of welded cans according to the present invention.

Referring to FIG. 3 illustrating the preparation process according to the present invention, in order to perform welding without removal of the chromium-containing covered layer from a TFS blank, it is important that electrode wires having a plated layer of a soft metal selected from the group consisting of tin and alloys thereof are used as the electrode wires 11 and 11' (often called "intermediate electrodes").

It has already been known from Japanese Patent Publication No. 36860/74 that an electrode wire provided with a plated layer of a soft metal such as tin having a thickness of 30 to 300 μm is used for electric resistance welding of a plated steel plate such as tinplate. In the present invention, the thickness of the plated layer in each of the electrode wires 11 and 11' is controlled to a very low level, that is, 0.1 to 20 μm, preferably 0.15 to 2 μm, and it has been found that by virtue of this characteristic feature, even a material including a coated layer of chromium oxide having a high electric resistance, such as a TFS blank, can be seamwelded very conveniently. More specifically, in the above-mentioned method, a relatively thick plated layer is interposed so as to reduce the electric resistance between the material 13 to be welded and the electrode wire 11 or 11', whereas, it has been found, if the thickness of the plated layer on the electrode is reduced according to the present invention in contrast with the above-mentioned patent, welding of a material having a chromium oxide layer of a high electric resistance can be accomplished very effectively and advantageously. When confronting laps are seam-welded, in order to obtain a weld seam excellent in the corrosion resistance, lacquer adhesion and appearance characteristics, it is important that the temperature of the both outer surface portions should be much lower than the temperature of the central portion of the laps, and this preferred temperature distribution can be provided in the lapped portion by using the electrode wires 11 and 11' provided with a specific plated layer having the above-mentioned thickness.

When the thickness of the plated layer of the electrode wire is too large and exceeds the above range, the temperature of the both outer surfaces of the lapped portion becomes too high at the welding process and the above-mentioned characteristics are degraded. It is believed that the reason is that slip is readily caused between the electrode wire and the surface of the can blank if the thickness of the plated layer is too large. If the thickness of the plated layer is too small and is below the above range, a voltage should be increased so as to apply an electric current necessary for welding, with the result that the chromium covered layer is broken and the iron-exposed area is increased.

A copper wire substrate having the above-mentioned plated layer formed thereon is used for each of the electrode wires 11 and 11', and it is preferred that the sectional shape of the electrode wire be flat and the sectional area of the electrode wire be 0.2 to 4 mm$^2$.

In order to control the thickness of the exposed iron oxide layer below 400 Å, it is important that electric resistance welding should be carried out in a non-oxidizing atmosphere. As the non-oxidizing atmosphere, there can be used, for example, nitrogen, argon, neon, helium, hydrogen and carbon monoxide. It is preferred that the welding operation be carried out in the state where a portion to be welded is maintained in a current of an inert gas such as mentioned above. The welding operation may be carried out in a sealed vessel filled with the above-mentioned inert gas. In order to control the thickness of the iron oxide layer within the above-mentioned range, it is preferred that a non-oxidizing atmosphere be used until the surface temperature of the welded portion is lowered to 550° C.

Figure 4:
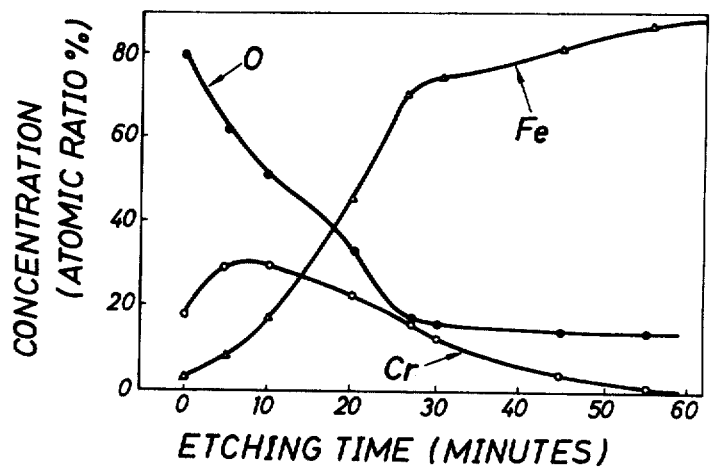
FIG. 4 is a graph illustrating the relation between the atom concentration and the etching time.

In the present invention, the thickness of the surface oxide layer is determined by measuring the atomic concentration ratio by ESCA [electron spectroscopy for chemical analysis (X-ray photoelectron spectroscopy)] while etching the surface in Ar gas. When etching of the welded portion of a can formed by welding in a non-oxidizing atmosphere was conducted at a rate of 15 Å/min in case of FE and O and at a rate of 26 Å/min in case of Cr, it was found that the oxygen concentration is highest on the outermost surface portion and the oxygen concentration is gradually reduced with advance of etching, and that the oxygen concentration becomes constant within about 20 to about 30 minutes. It is therefore considered that the thickness of the surface oxide layer is smaller than 400 Å. The obtained results are shown in FIG. 4.

If welding is carried out by incorporating a minute amount of air into the non-oxidizing atmosphere ($N_2$ current), the welded portion is gradually discolored.

From the results of our experiments, it was confirmed that if the welded portion is brown to dark brown, the thickness of the surface oxide layer is 410 to 450 Å and if the welded portion is completely dark brown, the thickness of the surface oxide layer is 700 to 800 Å.

The pressure to be applied to the lapped portion through the electrode wires 11 and 11' is suitably 20 to 90 Kg per welding point, and this pressure is applied by the electrode rolls 12 and 12'. Power sources of an alternating current, a direct current and a rectified wave current may be used as the power source for the electric resistance welding. Voltages and currents customarily adopted in manufacture of welded cans can be used in the present invention.

In the tin-free steel welded can according to the present invention, a continuous or discontinuous protecting covered layer is formed on the inner and outer surface portions of the seam and the exposed area of steel is controlled below 50% of the exposed area of steel in the conventional known tin-free steel welded can under the condition of using a non-plated copper wire electrode and an atmosphere of air. Therefore, the welded can of the present invention is prominently excellent over the conventional known welded can in the corrosion resistance and lacquer adhesion. Furthermore, although a blue or black layer of $Fe_3O_4$ or the like having a relatively large thickness is formed on the seam of the conventional known welded can, the surface of the seam of the welded can of the present invention is covered with the chromium oxide layer and the thickness of the exposed iron oxide layer is controlled below 400 Å. Therefore, the welded can of the present invention is highly improved over the conventional welded can in the surface appearance characteristics.

The present invention will now be described in detail with reference to the following Examples that by no means limit the scope of the invention.

EXAMPLE 1

Welded cans were prepared from a TFS blank having an amount of chromium of 50 mg/m$^2$, an amount of chromium oxide of 4 mg/m$^2$ as calculated as metallic chromium, a thickness of 0.23 mm and a hardness of T4 by welding under conditions described below in a current of an $N_2$ gas by using flat tin-plated copper wires having a plating thickness of 0.6 μm as wire electrodes 11 and 11' shown in FIG. 3.

Welding Conditions:
Welding speed of 7 m/min
Electrode-applied pressure of 50 Kg
Overlap length of 0.8 mm

COMPARATIVE EXAMPLE 1

Cans were prepared by carrying out the welding operation under the same conditions with the use of the same blank as in Example 1 except that copper wires are used as the electrode wires 11 and 11' and air was used instead of $N_2$.

EXAMPLE 2

Welded cans were prepared from a TFS blank having an amount of metallic chromium of 100 mg/m$^2$, a chromium oxide amount of 4.0 mg/m$^2$ as calculated as metallic chromium, a thickness of 0.23 mm and a hardness of T4 by carrying out the welding operation in $N_2$ gas by using tin-plated copper wires having a plating thickness of 0.6 μm as the intermediate electrodes under the same welding conditions, as in Example 1.

COMPARATIVE EXAMPLE 2

Cans were prepared by carrying out the welding operation under the same conditions with the use of the same TFS blank as in Example 2 except that the $N_2$ gas was not used but air was used as the welding atmosphere instead and copper wires were used as the intermediate electrodes.

The results obtained in Examples 1 and 2 and Comparative Examples 1 and 2 are shown in Table 1.

TABLE 1

|  | Example 1 | Comparative Example 1 | Example 2 | Comparative Example 2 |
|---|---|---|---|---|
| Electrode wires | tin-plated copper wires | copper wire | tin-plated copper wire | copper wire |
| Welding-allowable range* | 1520–1650 A | 1170–1200 A | 1470–1540 A | 1150–1160 A |
| Relative value of iron-exposed area** | 30 mA | 80 mA | 35 mA | 80 mA |
| Rusting test*** | O | X | Δ | X |

Note
Welding-allowable range*:
The welding current value at the time when molten iron was first extruded out from the welded portion at the welding process was defined as the upper limit value, and the welding current value at the time when non-welding was caused on the welded portion at the welding process was defined as the lower limit value. The range between these upper and lower limit values was defined as the welding-allowable range. The broader is this welding-allowable range, the more easily can be performed the welding operation.
Measurement of relative value of iron-exposed area**:
A can was filled with a buffer solution containing 0.2 mole/l of sodium carbonate and 2.0 mole/l of sodium bicarbonate and having a pH value of 10, and the iron-oxidizing current was measured by using the can as the anode and graphite as the cathode to determine the relative value of the iron-exposed area. The iron-oxidizing current is substantially proportional to the iron-exposed area. The voltage of a constant voltage device used for this measurement was arranged to a level where the current of oxidation of Sn and Cr could be neglected. The specimen used at this measurement was sampled by molding except the test piece along 50 mm in the welding direction and along 10 mm in the lateral direction, and therefore the area of the specimen was 50 mm × 10 mm.
Rusting test***:
A 5% salt solution maintained at 37° C. was sprayed to the sample for 30 minutes and the rusting state was observed with the naked eye. In Table 1, samples were compared with respect to the degree of rusting, and the sample having a higher degree of rusting is indicated by mark "X" and the sample having a lower degree of rusting is indicated by mark "O", while the sample having a medium degree of rusting in indicated by mark "Δ".

What is claimed is:
1. In a process for the preparation of welded cans, which comprises forming a can blank into a cylinder and passing a lap portion of the formed cylinder between a pair of electrode rollers through an electrode wire to effect electric resistance welding, the improvement wherein said can blank is a tin-free steel blank comprising a steel plate substrate, a layer of metallic chromium in the amount of 20 to 100 mg/m² formed on the surface of the steel plate substrate and a layer of chromium oxide in an amount of 1 to 10 mg/m², calculated as metallic chromium, formed on the metallic chromium layer; electric resistance welding is carried out in an inert atmosphere in the state where an electrode wire having a plated layer of a soft metal selected from the group consisting of tin and alloys thereof, the thickness of said plating layer being 0.1 to 20 μm, is kept in close contact with the chromium oxide layer of the tin-free steel blank; and after completion of welding, the lap portion is kept in an inert atmosphere until the surface of the lap portion is reduced below 550° C.
2. A process according to claim 1, wherein the thickness of the plated layer of the electrode wire is 0.15 to 2 μm.
3. a process according to claim 1, wherein electric resistance welding is carried out in the state where a pressure of 20 to 90 Kg is applied to said lap portion.
4. A process according to claim 1, wherein electric resistance welding is carried out in a current of an inert gas.
5. A process according to claim 1 or 4, wherein the inert gas is nitrogen.

* * * * *